H. B. NYLUND.
SEPARABLE FASTENING DEVICE.
APPLICATION FILED FEB. 12, 1916.
1,193,815.
Patented Aug. 8, 1916.
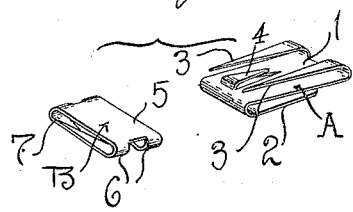
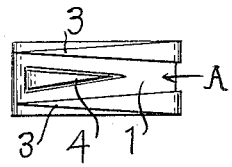
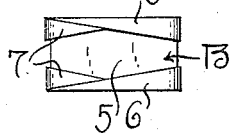
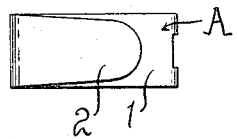
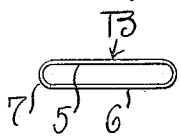
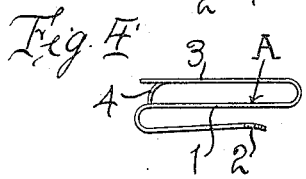
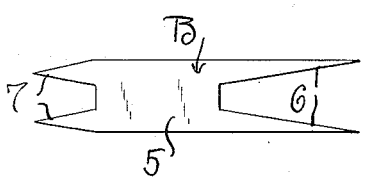
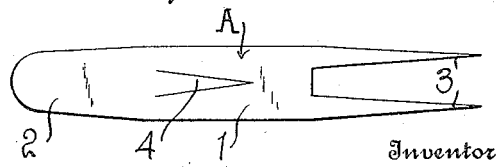
Inventor
HANNA B. NYLUND
By Watson E. Coleman
Attorney

UNITED STATES PATENT OFFICE.

HANNA B. NYLUND, OF STAMBAUGH, MICHIGAN, ASSIGNOR OF ONE-HALF TO GUSTAVUS R. WAEBER, OF IRON RIVER, MICHIGAN.

SEPARABLE FASTENING DEVICE.

1,193,815.   Specification of Letters Patent.   Patented Aug. 8, 1916.

Application filed February 12, 1916. Serial No. 78,012.

*To all whom it may concern:*

Be it known that I, HANNA B. NYLUND, a citizen of the United States, residing at Stambaugh, in the county of Iron and State of Michigan, have invented certain new and useful Improvements in Separable Fastening Devices, of which the following is a specification, reference being had to the accompanying drawings.

This invention relates to certain improvements in separable fastening devices and has relation more particularly to hooks and eyes formed of sheet metal, and it is an object of the invention to provide a fastener of this general character having novel and improved means whereby the same may be effectively secured in applied position without the necessity of employing thread.

The invention consists in the details of construction and in the combination and arrangement of the several parts of my improved fastener whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in perspective of a fastener constructed in accordance with my invention, the members thereof being in separated relation; Fig. 2 is a view in plan of the hook member comprised in my separable fastener; Fig. 3 is a plan view of the hook member reverse to what is shown in Fig. 2; Fig. 4 is an edge view of the hook member as herein included; Fig. 5 is a view of a blank from which my improved hook member, as herein embodied, is produced; Fig. 6 is a plan view of the eye member of my improved separable fastener as herein included; Fig. 7 is an edge view of the hook member as herein disclosed; and Fig. 8 is a view of a blank from which the eye member as herein set forth, is produced.

As disclosed in the accompanying drawings, my improved fastener comprises two coacting members A and B, the member A constituting a hook and the member B affording an eye.

The member A comprises an elongated strip of sheet metal including the body portion 1 substantially rectangular in form and having one end provided with the returned tongue 2 adapted to coact in a conventional manner with the eye B. The opposite end portion of the body 1 is provided with the transversely spaced returned prongs 3 reversely directed relatively to the tongue 2, and of a length substantially equal to the length of the body 1. It is also preferred that the prongs 3 be positioned immediately adjacent the longitudinal margins of the body 1 so that no obstruction will be afforded to the prong 4 struck from the body 1 intermediate the prongs 3 and disposed in a direction reverse to the prongs 3.

As herein embodied, the prong 4 is of a length less than the length of the body and extends from the end of the body with which the tongue 2 is connected to a point slightly beyond the longitudinal center of the body. As is believed to be clearly apparent, the prongs 3 and 4 are adapted to penetrate the cloth to which the member is adapted to be applied, and serves to effectively maintain the same in operative position.

The member B is provided with the elongated strip of sheet metal affording the body portion 5, having one end provided with the returned prongs 6 of a length substantially equal to the length of the body 5, while the opposite end of the body 5 is provided with the short returned tongues 7 preferably of a length less than one-half of the length of the body 5, and directed inwardly on converging planes so as to afford no obstruction to the penetration of the prongs 6 within the cloth to which the member is adapted to be applied, as is also true of the tongues 7.

From the foregoing description, it is thought to be obvious that a fastener constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A separable fastener including a hook member formed from an elongated strip of sheet metal having one end returned to afford a hook, the opposite end of the strip being provided with transversely spaced returned prongs reversely directed relatively to the tongue and overlying the opposite face of the strip and of a length substantially equal to the length of said face, said strip at a point midway the free ends of the prongs having a prong struck therefrom and arranged at the same side of the strip as the first named prongs, said last named prong being disposed reversely relatively to the first named prongs, the first named prongs and the second named prong affording securing means for the hook member.

In testimony whereof I hereunto affix my signature in the presence of two witnesses.

HANNA B. NYLUND.

Witnesses:
NELLIE P. JACOBSON,
SELMA SWANSON.

Copies of this patent may be obtained for five cents each, by addressing the "Commissioner of Patents, Washington, D. C."